United States Patent [19]
Mohr

[11] 3,863,283
[45] Feb. 4, 1975

[54] PILLOW WITH INTERIOR STORAGE COMPARTMENT

[76] Inventor: Carsten Mohr, 1550 Yellowstone, Space 97, Pocatello, Idaho 83201

[22] Filed: June 14, 1973

[21] Appl. No.: 369,931

[52] U.S. Cl............................... 5/341, 5/339
[51] Int. Cl............................... A47g 9/00
[58] Field of Search....... 5/337, 338, 339, 341, 340; 150/1

[56] References Cited
UNITED STATES PATENTS

| | | | |
|---|---|---|---|
| 2,293,530 | 8/1942 | Beehler | 5/341 |
| 3,148,389 | 9/1964 | Lustig | 5/341 X |
| 3,489,194 | 1/1970 | Hoover | 5/344 X |

Primary Examiner—Paul R. Gilliam
Assistant Examiner—Andrew M. Calvert
Attorney, Agent, or Firm—Clarence A. O'Brien; Harvey B. Jacobson

[57] ABSTRACT

A pillow having space therein for the storage of first-aid equipment comprises an outer envelope consisting of first and second panels joined, as by stitching, along their peripheries and having a non-joined portion, closed by a releasable slide fastener, for access to the interior of the envelope. Two liner panels are each joined about their peripheries to one of the first and second outer panels to define with the respective outer panel an enclosed pocket having pillow filler material therein. The liner panels define between them an interior storage compartment to receive first-aid equipment therein.

6 Claims, 3 Drawing Figures

PATENTED FEB 4 1975   3,863,283

PILLOW WITH INTERIOR STORAGE COMPARTMENT

The present invention relates generally to a combination pillow and storage compartment and, more particularly, to a pillow having an interior storage compartment especially suitable for receiving a first-aid kit therein.

Every day in this country motor vehicles injure or contribute to the injury of thousands of motorists. It is therefore only prudent that vehicles carry or be equipped with first-aid or safety kits to insure the immediate availability of at least some first-aid equipment at the scene of an accident. Most first-aid kits are now packaged in metal or carboard containers which are inconvenient to store in a vehicle and which can be dangerous to a vehicle occupant in the event of an accident.

Accordingly, it is an object of the present invention to provide a first-aid kit storage container which readily and conveniently fits within a vehicle and which is padded for safety.

It is another object of this invention to provide a pillow which is comfortably padded to serve as a head rest pillow and which includes an interior storage compartment to receive a first-aid kit therein.

It is still another object of the invention to provide a pillow having an easily accessible storage compartment therein, which pillow is easily stored within a vehicle.

Other objects and advantages will become apparent from the following description taken in conjunction with the accompanying drawings.

Figure 1:
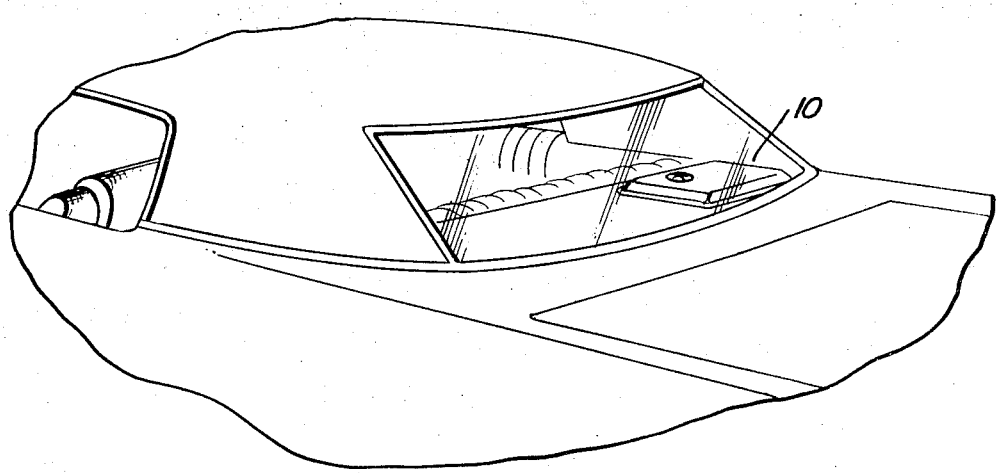
FIG. 1 is a perspective view of the rear window of an automobile showing the pillow of the present invention conveniently stored on the rear window platform.
Figure 2:
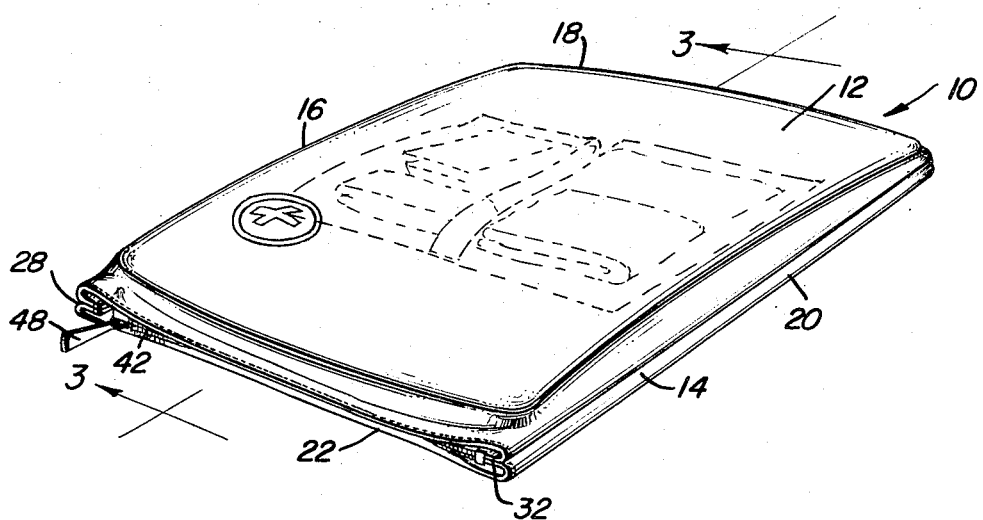
FIG. 2 is a perspective view of the pillow of the present invention.

Turning now to the drawings, the pillow of the present invention, designated generally as 10, is most clearly seen in FIG. 2. It will be appreciated that the pillow may be of any desired over-all configuration, but is preferably of rectangular shape as illustrated. In one embodiment, the pillow is constructed of two substantially rectangular outer panels stitched or otherwise joined together along three sides to form a rectangular pillow envelope having one open side. Disposed within the envelope are two substantially rectangular liner panels. Each of the liner panels is stitched or otherwise joined around its entire periphery to the periphery of one of the outer panels, thereby defining between each liner panel and the outer panel to which it is joined an enclosed pocket. The pockets are filled with a relatively soft pillow filler material such as down, natural or synthetic fibers, foamed material and the like. The liner panels define between them an interior compartment within the pillow envelope which is enclosed by stitching on three sides and preferably by a closure means, such as a conventional zipper, on the fourth side. The interior compartment is desirably of sufficient size to accommodate a substantial quantity of first-aid equipment 50, such as bandages, tape, antiseptic solutions, and the like. As seen in FIG. 1, the pillow is of compact construction and is readily stored on the rear window platform of a vehicle. Alternatively, the pillow can be slipped under a seat or tucked away in even the most crowded trunk.

Figure 3:
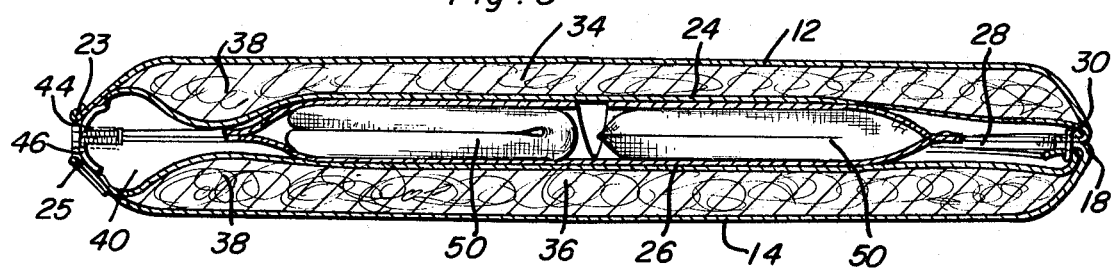
FIG. 3 is a sectional view taken substantially along the line 3—3 in FIG. 2.

Referring to FIGS. 2 and 3, it will be seen that pillow 10 consists of upper outer panel 12 and lower outer panel 14 which are of substantially the same periphery and dimensions. The panels are flexible and may be made of vinyl, fabric or other suitable pillow covering material. Along three of the coinciding borders 16, 18 and 20, the panels 12 and 14 are folded inwardly and joined by lines of stitching to define a pillow envelope open along one border 22. Along the border 22, panels 12 and 14 are folded inwardly upon themselves and the folds 23, 25 are held in place on each panel 12, 14, respectively, by a line of stitching. Interior liner panels 24 and 26 of substantially the same dimensions and periphery as panels 12 and 14 are disposed within the pillow envelope and joined by stitching along their entire periphery to the inwardly folded panel flanges 28, 30 and 32 which form the closures along the three borders 16, 18 and 20 of the envelope, and to the folds 23 and 25 along the border 22. The interior liner panels may be made of any suitable plastic, rubber or fabric material but are preferably thin, waterproof linings of suitable plastic material. Pockets 34 and 36 defined respectively by outer panel 12 and liner panel 24 and outer panel 14 and liner panel 26 are filled with conventional pillow filler material 38 to make the pillow comfortably padded and suitable for use as a head rest pillow or otherwise. Interior storage compartment 40 is defined between interior liner panels 24 and 26 and bounded along its perimeter by inwardly extending flanges 28, 30 and 32 and the open border 22.

The interior compartment is closed along border 22 by a conventional tooth and slide zipper fastener 42 or equivalent closure means. Zipper tapes 44 and 46 carry the zipper teeth and are stitched to the folds 23 and 25 along border 22. A conventional slide element 48 is slidably carried by the teeth and serves to bring the two sets of teeth into retaining engagement with one another. It will be appreciated that access to the interior of pillow 10 to insert or remove first-aid equipment may readily be had by appropriate operation of fastener 42 in a conventional manner.

While the present invention has been described with reference to particular embodiments thereof, it will be understood that numerous modifications can be made by those skilled in the art without actually departing from the scope of the invention. Accordingly, all modifications and equivalents may be resorted to which fall within the scope of the invention as claimed.

What is claimed as new is as follows:

1. A pillow having space therein for the storage of first-aid equipment comprising:

a. an outer pillow envelope comprising first and second outer panels having substantially identical peripheries joined along said peripheries and including a non-joined portion for access to the interior of said envelope;

b. first and second liner panels disposed between said outer panels and having peripheries substantially identical to said panel peripheries, each said liner panel joined about its entire periphery to one of said first and second panels and defining therewith an enclosed pocket, said liner panels defining therebetween an interior storage compartment adapted to receive first-aid equipment therein;

c. pillow filler material in each said enclosed pocket, said filler material sufficient to comprise comfortable padding for a head thereon when first-aid equipment is in said storage compartment; and
d. releasable closure means closing said non-joined portion.

2. A pillow, as claimed in claim 1, wherein said releasable closure means comprises slide fastener means.

3. A pillow, as claimed in claim 2, wherein said slide fastener means is a zipper.

4. A pillow, as claimed in claim 2, wherein said liner panel peripheries are joined to the peripheries of said first and second outer panels.

5. A pillow, as claimed in claim 4, wherein said first and second outer panels are joined to each other and to said liner panels by stitching.

6. A pillow, as claimed in claim 5, wherein said liner panels comprise a waterproof material.

* * * * *